US009477567B2

United States Patent
Simons et al.

(10) Patent No.: US 9,477,567 B2
(45) Date of Patent: Oct. 25, 2016

(54) METHOD FOR MONITORING A GRAPHICAL USER INTERFACE ON A SECOND COMPUTER DISPLAY FROM A FIRST COMPUTER

(71) Applicant: TESTPLANT, INC., Wilmington, DE (US)

(72) Inventors: Douglas P. Simons, Fort Collins, CO (US); Jonathan D. Gillaspie, Golden, CO (US)

(73) Assignee: TestPlant, Inc., Wilmington, DE (US)

( * ) Notice: Subject to any disclaimer, the term of this patent is extended or adjusted under 35 U.S.C. 154(b) by 0 days.

(21) Appl. No.: 14/219,968

(22) Filed: Mar. 19, 2014

(65) Prior Publication Data
US 2014/0208170 A1    Jul. 24, 2014

Related U.S. Application Data

(63) Continuation of application No. 12/963,620, filed on Dec. 8, 2010, which is a continuation of application No. 10/678,043, filed on Oct. 1, 2003, now Pat. No. 7,870,504.

(51) Int. Cl.
*G06F 11/22* (2006.01)
*G06F 9/44* (2006.01)
(Continued)

(52) U.S. Cl.
CPC ......... *G06F 11/2273* (2013.01); *G06F 3/0487* (2013.01); *G06F 3/04817* (2013.01); *G06F 3/04842* (2013.01); *G06F 9/4445* (2013.01);
(Continued)

(58) Field of Classification Search
CPC ........... G06F 111/2273; G06F 3/0487; G06F 9/4445

USPC .................................................. 715/740, 761
See application file for complete search history.

(56) References Cited

U.S. PATENT DOCUMENTS 4,617,663 A * 10/1986 Lake .................. G06F 11/3684
714/32
5,022,028 A    6/1991 Edmonds et al.
(Continued)

FOREIGN PATENT DOCUMENTS

WO    WO 03053058 A1 *  6/2003

OTHER PUBLICATIONS

Bing search q=scan+screen+bitmap+script&qs=n&pq= Dec. 7, 2015.*
(Continued)

*Primary Examiner* — Jeffrey A Gaffin
*Assistant Examiner* — John M Heffington
(74) *Attorney, Agent, or Firm* — Conley Rose, P.C.

(57) ABSTRACT

A high level interface between a remote computer and local computer operator permits the remote computer to be controlled via a sequence of interactions. The remote computer may be monitored for display information which is expected, and also controlled in the event the expected information either is or is not obtained. Command language extensions are provided which extend and complement a basic scripting language. Scripts with embedded command language extensions may be executed through a remote interface, permitting remote testing, operation and evaluation. The development of the scripts, including embedded command language extensions, may be prepared through execution of commands at the local computer on a depiction of the GUI received from the remote computer, and subsequently saved as a script.

30 Claims, 2 Drawing Sheets

(51) Int. Cl.
  *G06F 3/0481* (2013.01)
  *G06F 3/0484* (2013.01)
  *G06F 3/0487* (2013.01)
  *G06T 7/00* (2006.01)
  *G03G 15/00* (2006.01)
  *G06F 11/36* (2006.01)

(52) U.S. Cl.
  CPC ........... *G03G 15/50* (2013.01); *G06F 11/3672* (2013.01); *G06T 7/001* (2013.01); *G06T 7/0008* (2013.01)

(56) References Cited

U.S. PATENT DOCUMENTS

| | | | |
|---|---|---|---|
| 5,066,902 A * | 11/1991 | Watanabe | 318/568.16 |
| 5,140,650 A * | 8/1992 | Casey et al. | 382/283 |
| 5,157,782 A | 10/1992 | Tuttle et al. | |
| 5,249,270 A | 9/1993 | Stewart et al. | |
| 5,252,951 A * | 10/1993 | Tannenbaum et al. | 345/156 |
| 5,291,471 A | 3/1994 | Russell | |
| 5,321,838 A | 6/1994 | Hensley et al. | |
| 5,325,377 A | 6/1994 | Tuttle | |
| 5,333,302 A | 7/1994 | Hensley et al. | |
| 5,335,342 A * | 8/1994 | Pope et al. | 714/38.13 |
| 5,343,409 A | 8/1994 | Satterfield et al. | |
| 5,371,883 A | 12/1994 | Gross et al. | |
| 5,416,849 A * | 5/1995 | Huang | 382/173 |
| 5,428,694 A * | 6/1995 | Betts et al. | 382/317 |
| 5,475,843 A | 12/1995 | Halviatti et al. | |
| 5,499,108 A | 3/1996 | Cotte et al. | |
| 5,591,956 A | 1/1997 | Longacre et al. | |
| 5,594,892 A | 1/1997 | Bonne et al. | |
| 5,604,509 A | 2/1997 | Moore et al. | |
| 5,634,002 A | 5/1997 | Polk et al. | |
| 5,637,851 A | 6/1997 | Swartz et al. | |
| 5,646,602 A | 7/1997 | Gertz et al. | |
| 5,669,000 A | 9/1997 | Jessen et al. | |
| 5,699,263 A * | 12/1997 | Nakao | 702/115 |
| 5,732,212 A | 3/1998 | Perholz et al. | |
| 5,739,809 A | 4/1998 | McLaughlin et al. | |
| 5,778,230 A | 7/1998 | Wimble et al. | |
| 5,781,720 A | 7/1998 | Parker et al. | |
| 5,826,239 A | 10/1998 | Du et al. | |
| 5,874,966 A | 2/1999 | Polimeni et al. | |
| 5,881,230 A | 3/1999 | Christensen et al. | |
| 5,889,994 A | 3/1999 | Brown et al. | |
| 5,926,638 A | 7/1999 | Inoue | |
| 5,995,663 A | 11/1999 | Itsuzaki et al. | |
| 6,002,871 A | 12/1999 | Duggan et al. | |
| 6,005,964 A | 12/1999 | Reid et al. | |
| 6,023,580 A | 2/2000 | Sifter | |
| 6,026,236 A | 2/2000 | Fortin et al. | |
| 6,046,740 A | 4/2000 | LaRoche et al. | |
| 6,067,638 A | 5/2000 | Benitz et al. | |
| 6,118,447 A | 9/2000 | Harel | |
| 6,119,247 A | 9/2000 | House et al. | |
| 6,195,765 B1 | 2/2001 | Kislanko et al. | |
| 6,249,882 B1 | 6/2001 | Testardi | |
| 6,282,701 B1 | 8/2001 | Wygodny et al. | |
| 6,292,171 B1 | 9/2001 | Fu et al. | |
| 6,353,897 B1 | 3/2002 | Nock et al. | |
| 6,356,931 B2 | 3/2002 | Ismael et al. | |
| 6,370,589 B1 | 4/2002 | Sieber et al. | |
| 6,470,346 B2 | 10/2002 | Morwood | |
| 6,502,045 B1 | 12/2002 | Biagiaotti | |
| 6,571,003 B1 | 5/2003 | Hillebrand et al. | |
| 6,708,217 B1 * | 3/2004 | Colson et al. | 709/231 |
| 6,829,394 B2 * | 12/2004 | Hiramatsu | 382/291 |
| 6,904,389 B2 | 6/2005 | Hornberger et al. | |
| 6,907,546 B1 | 6/2005 | Haswell et al. | |
| 6,912,071 B1 * | 6/2005 | Rasmussen et al. | 358/406 |
| 6,980,686 B2 | 12/2005 | Kuwabara | |
| 7,046,848 B1 | 5/2006 | Olcott | |
| 7,120,299 B2 | 10/2006 | Keskar et al. | |
| 7,162,061 B1 * | 1/2007 | Takeo | G06T 7/0012 382/128 |
| 7,218,795 B2 * | 5/2007 | Trifonov et al. | 382/279 |
| 7,221,800 B2 | 5/2007 | Sesek et al. | |
| 7,241,993 B2 * | 7/2007 | Nakasuji et al. | 250/310 |
| 7,298,412 B2 * | 11/2007 | Sannoh et al. | 348/348 |
| 7,406,191 B2 | 7/2008 | Fujii et al. | |
| 7,433,068 B2 | 10/2008 | Stevens et al. | |
| 7,433,503 B2 * | 10/2008 | Cherek et al. | 382/128 |
| 7,457,464 B2 | 11/2008 | Stevens et al. | |
| 7,542,160 B2 | 6/2009 | Parry et al. | |
| 7,683,881 B2 | 3/2010 | Sun et al. | |
| 7,769,895 B1 * | 8/2010 | Williams et al. | 709/246 |
| 7,849,476 B2 * | 12/2010 | Stevens et al. | 725/34 |
| 8,055,015 B2 * | 11/2011 | Bouzar | 382/103 |
| 2001/0002697 A1 | 6/2001 | Hiroi et al. | |
| 2001/0022861 A1 * | 9/2001 | Hiramatsu | 382/291 |
| 2001/0052992 A1 * | 12/2001 | Tatsumi | H04N 1/622 358/1.9 |
| 2001/0055415 A1 * | 12/2001 | Nozaki | G01N 21/8851 382/141 |
| 2002/0039436 A1 | 4/2002 | Alumot et al. | |
| 2002/0054104 A1 | 5/2002 | Berczik et al. | |
| 2002/0057826 A1 * | 5/2002 | Imamura | G06T 5/20 382/128 |
| 2002/0062075 A1 * | 5/2002 | Takeo | G06T 7/0012 600/407 |
| 2002/0063702 A1 * | 5/2002 | Wada | H05N 5/20 345/204 |
| 2002/0075288 A1 * | 6/2002 | Matsumura | G06F 3/04897 345/690 |
| 2002/0090126 A1 * | 7/2002 | Oosawa | G06T 7/0012 382/132 |
| 2002/0099978 A1 | 7/2002 | Kraffert | |
| 2002/0100014 A1 | 7/2002 | Iborra et al. | |
| 2002/0101519 A1 | 8/2002 | Myers | |
| 2002/0111813 A1 | 8/2002 | Capps | |
| 2002/0131644 A1 * | 9/2002 | Takebe | 382/228 |
| 2002/0141641 A1 | 10/2002 | Zhu | |
| 2002/0152169 A1 | 10/2002 | Dutta et al. | |
| 2003/0012414 A1 | 1/2003 | Luo | |
| 2003/0020751 A1 | 1/2003 | Safa et al. | |
| 2003/0026457 A1 | 2/2003 | Nahum | |
| 2003/0031354 A1 * | 2/2003 | Takeo | G06T 7/0012 382/132 |
| 2003/0050761 A1 * | 3/2003 | Okabe | G01N 21/95607 702/82 |
| 2003/0053675 A1 | 3/2003 | Kuwabara | |
| 2003/0056150 A1 | 3/2003 | Dubovsky | |
| 2003/0058277 A1 | 3/2003 | Bowman-Amuah | |
| 2003/0065654 A1 * | 4/2003 | Ikushima | 707/3 |
| 2003/0066031 A1 | 4/2003 | Laane | |
| 2003/0071908 A1 | 4/2003 | Sannoh et al. | 348/345 |
| 2003/0115595 A1 * | 6/2003 | Stevens et al. | 725/32 |
| 2003/0121057 A1 | 6/2003 | Singh | |
| 2003/0123733 A1 * | 7/2003 | Keskar et al. | 382/187 |
| 2003/0126121 A1 * | 7/2003 | Khan et al. | 707/3 |
| 2003/0153823 A1 | 8/2003 | Geiser et al. | |
| 2003/0156199 A1 * | 8/2003 | Shindo | G07F 7/00 348/207.99 |
| 2003/0179915 A1 * | 9/2003 | Goto | A61B 6/463 382/128 |
| 2003/0179951 A1 | 9/2003 | Christiansen | |
| 2003/0182630 A1 * | 9/2003 | Saund et al. | 715/530 |
| 2003/0185431 A1 * | 10/2003 | Hong et al. | 382/147 |
| 2003/0198385 A1 | 10/2003 | Tanner et al. | |
| 2003/0221130 A1 | 11/2003 | Henry | |
| 2003/0233414 A1 | 12/2003 | Henry | |
| 2003/0233476 A1 | 12/2003 | Henry | |
| 2004/0015464 A1 * | 1/2004 | Ii et al. | 706/48 |
| 2004/0020989 A1 * | 2/2004 | Muramatsu | G06K 19/06037 235/462.1 |
| 2004/0021786 A1 * | 2/2004 | Nakamura | G06K 9/0004 348/294 |
| 2004/0032624 A1 | 2/2004 | Stevens et al. | |
| 2004/0049530 A1 | 3/2004 | Lok et al. | |
| 2004/0076323 A1 | 4/2004 | Fujii et al. | |
| 2004/0081341 A1 * | 4/2004 | Cherek et al. | 382/128 |

(56) References Cited

U.S. PATENT DOCUMENTS

| | | | |
|---|---|---|---|
| 2004/0113901 A1* | 6/2004 | Kawahara | G09G 3/20 345/204 |
| 2004/0165200 A1* | 8/2004 | Nabeshima | G06K 9/00463 358/1.9 |
| 2004/0165700 A1 | 8/2004 | Batchelder et al. | |
| 2004/0181754 A1 | 9/2004 | Kremer et al. | |
| 2004/0186801 A1* | 9/2004 | Morita | G06Q 40/10 705/32 |
| 2004/0201709 A1 | 10/2004 | McIntyre et al. | |
| 2005/0008212 A1 | 1/2005 | Ewing et al. | |
| 2005/0031165 A1 | 2/2005 | Olson et al. | |
| 2005/0035877 A1 | 2/2005 | Kim | |
| 2005/0047682 A1 | 3/2005 | Stevens et al. | |
| 2005/0057779 A1 | 3/2005 | Sesek et al. | |
| 2005/0082476 A1 | 4/2005 | Hiroi et al. | |
| 2005/0231746 A1 | 10/2005 | Parry et al. | |
| 2006/0228040 A1 | 10/2006 | Simon et al. | |
| 2007/0131877 A9 | 6/2007 | Hiroi et al. | |
| 2007/0217687 A1 | 9/2007 | Arima | |
| 2009/0052750 A1 | 2/2009 | Steinberg et al. | |
| 2009/0087042 A1 | 4/2009 | Steinberg et al. | |
| 2009/0148033 A1 | 6/2009 | Alumot et al. | |
| 2010/0197376 A1 | 8/2010 | Kerr | |

OTHER PUBLICATIONS

Bing search q=scan+screen+image+script&src=IE-Se Dec. 7, 2015.*
Take screenshot via script techtalkz Dec. 7, 2015.*
USPTO Non-Final Office Action dated Oct. 3, 2014.
USPTO Non-Final Office Action dated Oct. 3, 2007.
USPTO Final Office Action dated Apr. 16, 2008.
USPTO Non-Final Office Action dated Nov. 13, 2008.
USPTO Final Office Action dated Aug. 4, 2009.
USPTO Non-Final Office Action dated Jan. 21, 2010.

\* cited by examiner

METHOD FOR MONITORING A GRAPHICAL USER INTERFACE ON A SECOND COMPUTER DISPLAY FROM A FIRST COMPUTER

CROSS-REFERENCE TO RELATED APPLICATIONS

This application is a continuation of U.S. patent application No. 12/963,620, filed Dec. 8, 2010, entitled "Method for Monitoring a Graphical User Interface on a Second Computer Display from a First Computer," which is a continuation of U.S. patent application Ser. No. 10/678,043, filed Oct. 1, 2003, entitled "Method for Monitoring a Graphical User Interface on a Second Computer Display from a First Computer," now U.S. Pat. No. 7,870,504, issued on Jan. 11, 2011, all of which are incorporated herein in their entirety for all purposes.

BACKGROUND OF THE INVENTION

1. Field of the Invention

This invention pertains generally to computer systems, and more particularly to methods and techniques for monitoring, testing and controlling the operation of one or more computers through communications links.

2. Description of the Related Art

With the early development of computers, all processing capability was located at a single computer system. These early machines were massive structures using many vacuum tubes, the result of which was the generation of an enormous amount of heat, and an associated sensitivity to environment. With these massive structures, all processing was performed centrally at this main computer, owing to the substantial expense required for isolation and environmental control. While remote communications with a computer system were sometimes used, the use was extremely infrequent and necessarily limited owing to the poor communications capability available at the time. These limitations of the need for environmental control and lack of adequate communications capability each persisted for several decades.

Progress in the semiconductor industry, initially with compact calculators beginning shortly after 1970 and followed by much more concentrated and capable chips suitable for computers less than a decade later, diminished and has ultimately virtually eliminated the need for extensive environmental control. Likewise, communications equipment, protocols and bandwidth compression have opened up the ability for substantial remote communications that were inconceivable only a few years ago.

For years, essentially from the days of first deployment of desktop computing, when a problem was encountered with a system, a computer user would be forced to resort to verbal telephone support with the hardware manufacturer. The waiting queues for these technical support personnel were notoriously long, with on-hold waits longer than an hour commonplace. When the technical support personnel were contacted, then the user would have to work verbally with the technical support person, and the support personnel would have to rely upon the computer users accurately describing the status and events, and performing operations requested by the support personnel. This arrangement was clearly less than optimum, requiring many times the effort that would have been required for the support personnel or a technician to directly diagnose and resolve the problem. Nevertheless, heretofore there has been little available for rapidly diagnosing the source of problems.

Unfortunately, many of the same issues and challenges face software vendors as those outlined above with regard to hardware manufacturers. When a particular program is prepared, the preparation work is usually performed upon a single type of computer having a particular combination of software installed thereon. All too frequently, the code will unintentionally rely upon components or features, such as may be found in the operating system, BIOS, system components or the like, which may vary from computer to computer. These variations may be based upon the release date of the particular computer, the software available at that time, upgrades provided by other vendors at the time of installation of their software, and other factors. At the time of deployment of early versions of the software, commonly referred to as alpha or beta versions, many of the incompatibility issues with diverse computers are discovered. Unfortunately, heretofore there has been no efficient way to diagnose the incompatibility, nor to quickly test the computer or isolate the source of the problem. Help databases have been prepared where persons may look for similar problems. Nevertheless, the amount of time involved in isolating and diagnosing a problem is still enormous and a source of much waste in the industry.

Even during the development of the software, substantial testing must be done. As is known in the art of programming, while a change in one part of the source code may not be expected to have an effect elsewhere, all too frequently this expectation is incorrect. As a result, even the most or changes require substantial testing and validation to ensure that the changes do not disrupt the performance of a program at any other point. Presently, many software companies employ persons specifically in the role of testing. These persons will be assigned the chore of interacting with the computer as though they were a regular user, trying out each of the functions and determining whether any bugs may be identified. This approach also requires substantial operation by testing personnel, and is somewhat unreliable owing to the difficulty in determining whether the testers are, in fact, completing the testing properly and thoroughly. Nevertheless, this approach still provides cost saving over discovering a problem in the field after the software or hardware has been released more generally. Furthermore, the reputation of the company is improved by having fewer problems with the released software or hardware than competitors who utilize less thorough testing.

In the area of system administration, similar problems are also encountered. An IT professional will typically be called upon to implement a new program, upgrade or other such tasks throughout an entire network or system. In such instance, the administrator will frequently be required to visit each and every computer in order to perform the necessary tasks, and to verify the proper functioning thereof. This opportunity to access the computers has been made far more difficult with the advent of mobile systems and wireless communications, where many more of the computers connected through the network are not physically accessible at any given time.

In order to verify the performance of either software, hardware or a combination of the two, and regardless of whether the verification is being driven from the perspective of a manufacturer, developer, vendor, technical support, or internal maintenance within a single organization, this verification requires substantial interaction with the computer.

In an attempt to reduce the overhead associated with software debugging, a number of persons have developed methods for testing software by using a computer program. Many of these methods send information directly to the software or hardware, thereby bypassing the normal input channels and operations. Representative of the computer testing methods are U.S. Pat. No. 5,371,883 to Gross et al; U.S. Pat. No. 6,046,740 to LaRoche et al; U.S. Pat. No. 6,026,236 to Fortin et al; U.S. Pat. No. 5,022,028 to Edmonds et al; U.S. Pat. No. 5,249,270 to Stewart et al; U.S. Pat. Nos. 5,321,838 and 5,333,302 to Hensley et al; U.S. Pat. No. 5,335,342 to Pope et al; U.S. Pat. No. 5,594,892 to Bonne et al; U.S. Pat. No. 5,881,230 to Christensen et al; U.S. Pat. No. 5,926,638 to Inoue; U.S. Pat. No. 5,669,000 to Jessen et al; U.S. Pat. No. 6,119,247 to House et al; U.S. Pat. No. 6,195,765 to Kislanko et al; U.S. Pat. No. 6,249,882 to Testardi; U.S. Pat. No. 6,282,701 to Wygodny et al; and U.S. Pat. No. 6,353,897 to Nock et al; and 2002/0,099,978 to Kraffert, the contents of each which are incorporated herein for their teachings of the various methods and techniques associated with the control and operations associated with such systems. Nevertheless, no high level methods are introduced which readily permit the operator to perform the desired tests and operations on remote computers, particularly while interacting through the same or similar input devices and channels as would occur with standard human operations.

SUMMARY OF THE INVENTION

In a first manifestation, the invention is, in combination, a communications interface between a local computer and a remote system having a graphical user interface; a scripting language; and graphical user interface language extensions that enable the scripting language to control the remote system responsive to images appearing on the remote system graphical user interface.

In a second manifestation, the invention is a method for remotely testing the operation of a computer system. According to the method, a first element of the computer system graphical user interface is received. A user input action is then generated within the computer system responsive to the first element. The computer system graphical user interface is monitored for an expected second element within a predetermined time interval. A failure is signaled if the predetermined time interval elapses without detecting the expected second element.

In a third manifestation, the invention is a programmerator enabling a local system to remotely operate a computer system through local scripts and selectively respond to changes in graphical displays upon a graphical user interface of the remote computer system. A command capture interface displays a depiction of the remote system graphical user interface display and captures user input made therein. A command language set implements user input emulations representative of captured user input at the remote computer system and also implements image processing of the remote computer system graphical displays when processed by the local system. A scripting language has scripting commands that control a flow of execution of the local system in combination with command language set. An interface communicates between local system and remote computer system graphical user interface, responsive to the command and scripting languages.

OBJECTS OF THE INVENTION

Exemplary embodiments of the present invention solve inadequacies of the prior art by providing a high level interface between a computer and operator which will permit the computer to be controlled via a sequence of interactions. The computer may be monitored for display information which is expected, and also controlled in the event the expected information either is or is not obtained. The scripts may be executed through a remote interface, permitting remote testing, operation and evaluation.

A first object of the invention is to enable the execution of a plurality of user inputs directly through the computer system while responding to a video display. A second object of the invention is to enable the control of actions within the computer based upon the display. Another object of the present invention is to provide this capability using high level controls and commands that are intuitive and readily used. A further object of the invention is to enable this interaction and control to be instituted remotely through a communications interface through common Internet connection. Yet another object of the present invention is to enable both hardware and software developers to thoroughly test and evaluate the performance and operation of their developments and enhancements rapidly and with only minimal expense. An even further object of the invention is to permit a network or systems administrator to reliably, simply and quickly execute operations within an enterprise systems network, preferably without having to physically visit each of the computing devices within the network, and which would have been heretofore conducted with more time consuming, difficult and less reliable techniques.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
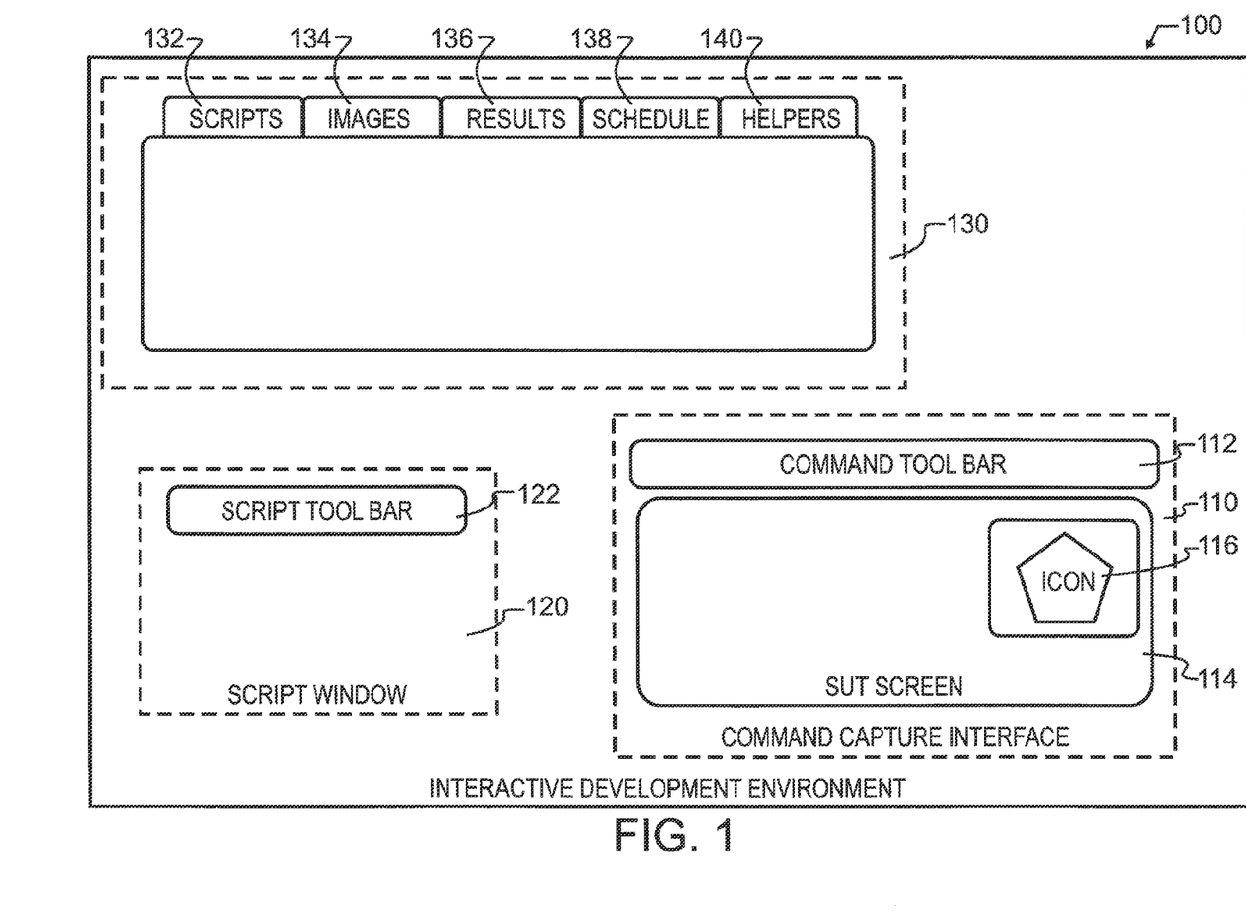
FIG. 1 illustrates a preferred graphical user interface designed in accord with the teachings of the present invention.

Manifested in the preferred embodiment, the present invention provides a computer user the ability to control any other computer connected through an interface, using the standard graphical user interface (GUI). As illustrated in FIG. 1, a user interface which takes the form of an interactive development environment (IDE) 100, will preferably include several functional windows 110, 120, 130 therein. More particularly, window 110 provides a command capture interface which most preferably provides a system-under-test (SUT) screen display 114 which provides a visual depiction of the display screen generated by the system for which the operation of the interactive development environment 100 is designed to control. Within that display there will be various graphical representations 116 that may take the form of icons as illustrated, or various buttons, message boxes, prompts or any other graphical image or control. The depiction may be an exact copy of the remote graphical user interface, a resized or scaled version, or may further include various image manipulations such as color conversions or other manipulations as deemed suitable and appropriate for a given application. A command tool bar 112 is provided which allows a user of interactive development environment 100 to select what type of command or action will most desirably be implemented at any given state within the system-under-test screen display 114. These commands will most desirably replicate the functions at the system-under-test screen display 114. These were, in fact, executed directly upon that system. Preferably, such commands will include keyboard commands and mouse commands, though it will be understood that any form of user input may be emulated. Consequently, touch screen monitors, graphics pads or tablets, and any other type of primary or peripheral input device may be emulated as required and designed for. In the case of the keyboard commands, two commands may, for exemplary purposes only and not limited thereto, be implemented. The commands include a "TypeText" command and a "TypeCommand" command. These two commands permit any keyboard input available to be implemented, and yet provide a very understandable means to implement the same. In other words, where simple text must be entered, the "TypeText" command will be utilized. Where function and command keys are to be implemented, the "TypeCommand" function may be used. These commands are most preferably higher level language commands which will later be processed by a specific language extensions processor 255 described in greater detail herein below with regard to FIG. 2. Similarly, such mouse functions as "Click", "DoubleClick", "RightClick", "MouseButtonDown", "MoveTo", "Drag", and "MouseLocation( )" may be implemented. For the purposes of this disclosure, and as is commonplace in the computer arts, it will be understood that the use of parentheses denotes the implementation of a function that may include data or other variables that are being passed either from or to the function. Special commands such as "ClickAny", the operation which will be described herein below, may also be implemented.

Operation of the present invention depends upon the graphical user interface. The myriad of possible functions and displays that may be produced as a result of an operation are extensive. For example, there are times where an operation may result in an introduction of one of a variety of controls. Where a single entity is anticipated, the image of the entity can be stored through the command capture interface window 110, and, when such image is later detected during execution of a script, an appropriate action can be selected, such as the "Click" command which would represent a mouse click upon a particular point in the screen. While many times this "Click" command may be executed directly upon the entity which newly appears upon the system-under-test screen 114, the direct action upon such an entity is not required. Instead the user of interactive development environment 100 has complete control over any of the user actions that may be relayed to the system-under-test 290, such as providing typed text, commands, movement of the mouse, and so forth. Consequently, the appearance of an object may stimulate any suitable action. Where such action would be to send a click on any active component that may appear on the screen, the "ClickAny" command will most preferably be provided, which enables the click to occur on any entity that may appear. Furthermore, in one contemplated embodiment, the activation of keystrokes or mouse clicks directly within the system-under-test screen 114 may be directly transferred as commands that are captured, or there may alternatively be a button to select which initiates and subsequently stops the recording of such within system-under-test screen 114 actions.

Since the present invention is designed to control graphical user interfaces, several commands are contemplated herein, but once again not considered to be solely limiting or restricted thereto. These image commands will most preferably include screen image searching commands and specific image information. Exemplary of the screen image searching commands are such commands as "WaitFor", "WaitForAny", "WaitForAll", "RefreshScreen", "ImageFound( )", "AnyImageFound( )", "ImageLocation( )", "AnyImageLocation( )", "EveryImageLocation( )", and other similar commands. A variety of information will most preferably be obtained or obtainable with regard to specific images, through such commands as "ImageInfo( )", "FoundImageNumber( )", "FoundImageName( )", "FoundImageLocation( )" "ImageHotSpot( )", and "ImageSize( )". Utilizing the above command set, it is possible to monitor a graphical user interface for any type or shape of image and then, responsive to the presence thereof, select a subsequent user action as though the user action were being performed directly upon the system-under-test 290 rather than from a source or controlling computer. In the event an unexpected event or entity appears upon the screen, the user, through the integrated development environment 100, has the opportunity to control the operation of the local and remote systems responsive thereto. For example, if a particular object is expected to appear upon the system-under-test screen 114 within a particular time interval, and the time expires prior to the object appearing, then it would be possible for a script entered within script window 120 to dine out and cause an error message or warning message or the like to appear upon the local computer screen. The scripting window will most preferably provide access to functions and commands through, for exemplary purposes only, script tool bar 122 that are commonly associated with or available through any of the various scripting languages or more fundamental programming languages. Such functionality as decision structures, loops, timers, and the various other myriad of functions available therein as are well known will most preferably be incorporated herein, in accord with the particular language incorporated herewith or developed for operation herein. One such example is "SenseTalk", though other suitable scripting languages are certainly contemplated herein, and will be dependent upon the preferred operating platform or cross-platform capability desired.

Most preferably, interactive development environment 100 will additionally include a window 130 which provides access to various organizational functions, which may, in the preferred embodiment, be implemented using the familiar index tab analogy. Among the available index tabs may, for exemplary purposes only, be functions such as the storage of various scripts 132, images 134, results from past script executions 136, scheduling of planned script executions 138, and the identification and or the location of helper script and image files 140, which may be local, on a network, or located anywhere on the Web.

Figure 2:
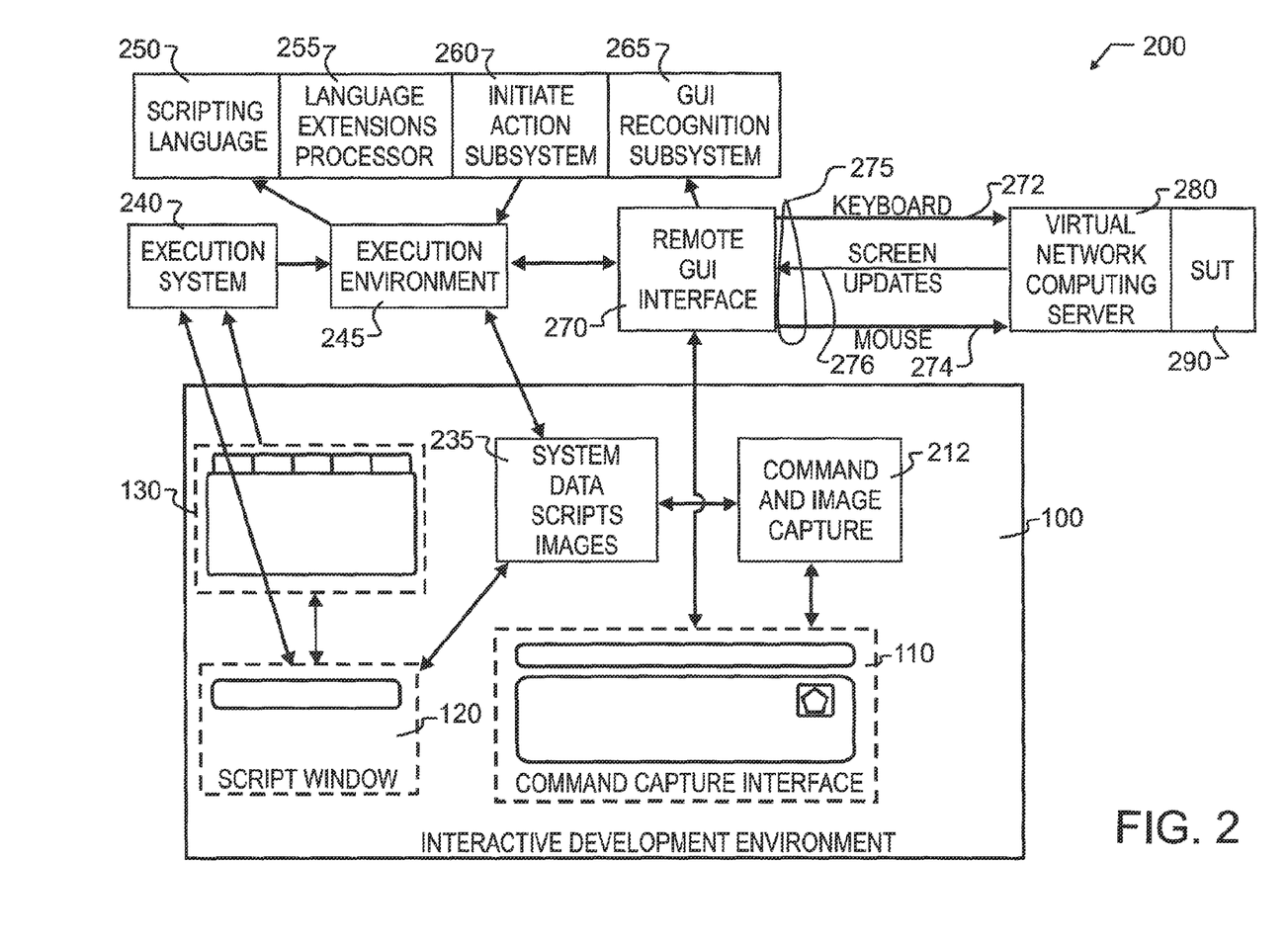
FIG. 2 illustrates a preferred functional block diagram for the execution of functions designed in accord with the teachings of the present invention.

While FIG. 1 provides a basic overview of the user view provided through the interactive development environment 100, FIG. 2 illustrates the functional interconnection of the interactive development environment 100 components with the various additional components that are not visible upon the screen to form the preferred programmerator system 200. More particularly, the presentation of the system-under-test screen 114 is achieved by a remote GUI interface 270. A command and image capture system 212 is responsible for the capture of appropriate commands from command tool bar 112 and image information such as icon 116. Consequently, when a user selects a particular command, such as a mouse click or the like, this command must be captured and incorporated into the appropriate scripting information.

Likewise, the inclusion of an expected image or others of the herein above described image or user control commands must be incorporated. These commands, which are not native to prior art operating systems, programming or scripting languages, are passed through to the system data, scripts and images controller 235. Controller 235 is responsible for the appropriate redirection and incorporation of command, graphics and scripts between execution environment 245, script window 120, and command and image capture system 212. For example, when a command is received from command and capture system 2112, this command and any associated language will preferably be inserted into scripting window 120. Likewise, the passing of images from the execution environment 245 will occur through controller 235. Script window 120, which would in operation contain an active script, may be processed directly through execution system 240 for a real-time run, or may be passed through organizational window 130 for storage and scheduling therein.

Ultimately, a given script will be executed through the execution system 240, which is configured to carry out the processes specified within a script. While somewhat simplistic in description, the execution system 240 and execution environment 245 are typically comprised by the local CPU, memory, OS, and the like. The command processor or CPU will effect or control much of the execution within system 240, but will be monitoring a diverse set of status indicators, potentially both locally and at the system-under-test 290, programming calls, and the like. These various items being monitored comprise in part the execution environment 245.

As the script is being processed, execution environment 245 will need to call the scripting language processor 250, which may be an interpreter, compiler or other suitable language processor. The scripting language has been extended in the preferred embodiment by various GUI commands and controls that are created through the command capture interface 110, such as the various mouse events and the like. Consequently, these commands must be processed not by the scripting language processor 250, but instead by a language extensions processor 255. As a result of the processing of the scripting language and the language extensions, an action may require to be initiated, which would be detected and triggered in the initiate action subsystem 260, which will relay the action back to execution environment 245. In the event this is an action intended for the system-under-test 290, such action will be relayed from execution environment 245 through remote GUI interface 270. The purpose of the remote GUI interface 270 is to implement an interface with the remote system-under-test 290, preferably relatively independently of the characteristics of communications channel 275 used and the data exchange rate associated therewith. This consists of providing client function to facilitate communication with the GUI server on the remote system-under-test 290, and to implement any needed out-of-band communication. Included are such operations as the client-server functions of retrieving images, sending keyboard and mouse commands, and initiating error recovery procedures as needed.

Communications channel 275 will in the preferred embodiment include a keyboard channel 272, mouse channel 274, and a transfer of screen updates from VNC server 280 back to the remote GUI interface 270. Communications channel 275 may be a high speed trunk line or cable, or may alternatively be a relatively slow-speed dial-up or RS-232 type connection. With proper selection of components, the preferred embodiment has much flexibility to operate through diverse communications channels having very different data transfer rates and signal to noise ratios.

To achieve broader application to more and more diverse systems-under-test 290, remote GUI interface 270 through a communications channel 275 communicates with remote computer virtual network computing server 280 or the like. As illustrated herein, the remote GUI interface 270 and VNC server 280 are most preferably VNC components which are readily available commercially and which operate as cross-platform components to directly interface with a remote system GUI. Nevertheless, other standard interfaces may be supported.

Images from the system-under-test 290 GUI will be relayed through VNC server 280 or the equivalent back to local system remote GUI interface 270, and from there routed to the GUI recognition subsystem 265. GUI recognition subsystem 265 dynamically scans the screen image of the remote system-under-test 290 for any bit-map images which the initiate action subsystem 260 is searching for. The goal of GUI recognition subsystem 265 is to locate images and signal the presence of such images to the initiate action subsystem 260 through an image detection signal, initiate recovery procedures such as moving the mouse cursor to locate images, or to report that the sought-after images are not available. GUI recognition subsystem 265 cooperates with the initiate action subsystem 260 and language extensions processor 255 output to determine whether a desired event or image has been created and if so, to execute the desired image identification actions requested within the language extensions received from language extension processor 255 through the execution environment 245.

Initiate action subsystem 260 initiates any action requested by the language extensions received from language extensions processor 255, which could be active commands to type text through the keyboard or to move the mouse in a number of ways. The commands may also in the preferred embodiment include passive commands to search the screen image on a continuing basis for a specific bit-map image, and, for exemplary purposes, terminating the search after a given period of time has elapsed.

While the preferred embodiment programmerator system 200 depends upon GUI image location, this may be practiced in one of several different ways. One approach is to directly map bits and to locate based upon this matching bit pattern. Said another way a black border with a blue interior and a yellow button bar may comprise the image of interest, which might, in this case, be a control or graphic. However, when some potential systems-under-test 290 are configured with a different color scheme, the same control may be comprised of a different color set and would, using this simpler approach, go undetected. Several approaches may be used to overcome this limitation. One such approach is to develop a custom color scheme at the local computer, in effect translating the remote system-under-test 290 display to the local color scheme. This may, for example, be achieved by access the system-under-test 290 and determining the color scheme being implemented within the operating system or the like to determine what color translations are required to restore color variations to a common baseline. Another approach is to map and convert the images based upon geometry into particular color sets. Yet another approach is to convert to black and white colors. Depending upon the design and intent, and the types of systems to be tested or controlled, one or more approaches may be provided or available within the operation of the programmerator system 200.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

What is claimed is:

1. A computer system for testing a mobile device, the computer system being connected to the mobile device and comprising:
a memory unit that stores instructions comprising a testing script; and at least one processing unit that executes the testing script to:
receive a representation of a graphical user interface of the mobile device;
detect a presence or absence of a first graphical element in the received representation of the mobile device graphical user interface based on an image analysis; and
in direct response to detecting a presence of the first graphical element, automatically provide a signal to the mobile device to initiate an input action on the mobile device graphical user interface, wherein the input action is specified by a specific script command in the testing script.

2. The computer system of claim 1, wherein the input action emulates an input command from a peripheral input device including at least one selected from a group comprising: a keyboard, a mouse, and a touch screen device.

3. The computer system of claim 1, wherein the input action includes at least one selected from a group comprising: a mouse click, a mouse movement, and text entry.

4. The computer system of claim 1, wherein the first graphical element comprises less than the entire representation of the mobile device system graphical user interface.

5. The computer system of claim 4, wherein the first graphical element comprises at least one selected from a group comprising: an icon, text, a text box, and a prompt.

6. The computer system of claim 1, wherein the at least one processing unit further executes the testing script to:
automatically provide as the signal, a first signal to execute a first input action at the mobile device, in response to detecting a presence of the first graphical element in the received representation of the mobile device graphical user interface during the search.

7. The computer system of claim 1, wherein the at least one processing unit further executes the testing script to:
indicate a failure, in response to detecting an absence of the first graphical element in the received representation of the mobile device graphical user interface during the search.

8. The computer system of claim 1, wherein the at least one processing unit further executes the testing script to:
receive an additional representation of the graphical user interface of the mobile device subsequent to automatically providing the signal to the mobile device to initiate the input action in accordance with the testing script; and
detect a presence or absence of a second graphical element in the additionally received representation of the mobile device graphical user interface based on an image analysis.

9. The computer system of claim 8, wherein the at least one processing unit further executes the testing script to:
based on a result of detecting a presence of the second graphical element, automatically provide a signal to the mobile device to initiate another input action on the mobile device graphical user interface in accordance with the testing script.

10. The computer system of claim 1, further comprising:
a local display that depicts the received representation of the mobile device graphical user interface.

11. The computer system of claim 1, wherein the at least one processing unit further executes the testing script to:
capture user input effected with respect to the representation of the mobile device graphical user interface display; and
generate the testing script based on the captured user input.

12. A method implemented at a computer system for testing a mobile device connected to the computer system, the method executed by at least one processor and comprising:
receiving a representation of a graphical user interface of the mobile device;
detecting a presence or absence of a first graphical element in the received representation of the mobile device graphical user interface based on an image analysis; and
in direct response to detecting a presence of the first graphical element, automatically providing a signal to the mobile device to initiate an input action on the mobile device graphical user interface, wherein the input action is specified by a specific script command in the testing script.

13. The method of claim 12, wherein the input action emulates an input command from a peripheral input device including at least one selected from a group comprising: a keyboard, a mouse, and a touch screen device.

14. The method of claim 12, wherein the input action includes at least one selected from a group comprising: a mouse click, a mouse movement, and text entry.

15. The method of claim 12, wherein the first graphical element comprises less than the entire representation of the mobile device system graphical user interface.

16. The method of claim 14, wherein the first graphical element comprises at least one selected from a group comprising: an icon, text, a text box, and a prompt.

17. The method of claim 12, wherein the method further comprises:
automatically providing as the signal, a first signal to execute a first input action at the mobile device, in response to detecting a presence of the first graphical element in the received representation of the mobile device graphical user interface during the search.

18. The method of claim 12, further comprising:
indicating a failure, in response to detecting an absence of the first graphical element in the received representation of the mobile device graphical user interface during the search.

19. The method of claim 12, further comprising:
receiving an additional representation of the graphical user interface of the mobile device subsequent to automatically providing the signal to the mobile device to initiate the input action in accordance with the testing script; and
detecting a presence or absence of a second graphical element in the additionally received representation of the mobile device graphical user interface based on an image analysis.

20. The method of claim 19, further comprising:
based on a result of detecting a presence of the second graphical element, automatically providing a signal to the mobile device to initiate another input action on the mobile device graphical user interface in accordance with the testing script.

21. The method of claim 12, further comprising:
depicting, on a local display, the received representation of the mobile device graphical user interface.

22. The method of claim 12, further comprising:
capturing user input effected with respect to the representation of the mobile device graphical user interface display; and
generating the testing script based on the captured user input.

23. A non-transitory computer-readable storage medium storing a testing script for enabling a computer system to implement a method for testing a mobile device connected to the computer system, the method comprising:
receiving a representation of a graphical user interface of the mobile device;
detecting a presence or absence of a first graphical element in the received representation of the mobile device graphical user interface based on an image analysis; and
in direct response to detecting a presence of the first graphical element, automatically providing a signal to the mobile device to initiate an input action on the mobile device graphical user interface, wherein the input action is specified by a specific script command in the testing script.

24. The non-transitory computer-readable storage medium of claim 23, wherein the input action emulates an input command from a peripheral input device including at least one selected from a group comprising: a keyboard, a mouse, and a touch screen device.

25. The non-transitory computer-readable storage medium of claim 23, wherein the input action includes at least one selected from a group comprising: a mouse click, a mouse movement, and text entry.

26. The non-transitory computer-readable storage medium of claim 23, wherein the first graphical element comprises less than the entire representation of the mobile device system graphical user interface.

27. The non-transitory computer-readable storage medium of claim 26, wherein the first graphical element comprises at least one selected from a group comprising: an icon, text, a text box, and a prompt.

28. The non-transitory computer-readable storage medium of claim 23, wherein the method further comprises:
automatically providing as the signal, a first signal to execute a first input action at the mobile device, in response to detecting a presence of the first graphical element in the received representation of the mobile device graphical user interface during the search.

29. The non-transitory computer-readable storage medium of claim 23, wherein the method further comprises:
indicating a failure, in response to detecting an absence of the first graphical element in the received representation of the mobile device graphical user interface during the search.

30. The non-transitory computer-readable storage medium of claim 23, wherein the method further comprises:
receiving an additional representation of the graphical user interface of the mobile device subsequent to automatically providing the signal to the mobile device to initiate the input action in accordance with the testing script; and
detecting a presence or absence of a second graphical element in the additionally received representation of the mobile device graphical user interface based on an image analysis.

* * * * *